(12) United States Patent
Lin et al.

(10) Patent No.: US 12,476,537 B2
(45) Date of Patent: Nov. 18, 2025

(54) BOOST CONVERTER

(71) Applicant: National Taiwan University of Science and Technology, Taipei (TW)

(72) Inventors: Jing-Yuan Lin, New Taipei (TW); Yi-Feng Lin, Yilan County (TW); Chuan-Ting Chen, New Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 359 days.

(21) Appl. No.: 18/114,323

(22) Filed: Feb. 27, 2023

(65) Prior Publication Data

US 2024/0186893 A1 Jun. 6, 2024

(30) Foreign Application Priority Data

Dec. 1, 2022 (TW) .................................. 111146078

(51) Int. Cl.
*H02M 3/00* (2006.01)
*H02M 3/07* (2006.01)
*H02M 3/158* (2006.01)

(52) U.S. Cl.
CPC .............. *H02M 3/01* (2021.05); *H02M 3/07* (2013.01); *H02M 3/158* (2013.01)

(58) Field of Classification Search
CPC ............ H02M 3/01–015; H02M 3/07; H02M 1/0058; H02M 3/155; H02M 3/157–1588; H02M 3/335; H02M 3/33569–33592
See application file for complete search history.

(56) References Cited

U.S. PATENT DOCUMENTS

| | | | |
|---|---|---|---|
| 5,959,438 A | 9/1999 | Jovanovic et al. | |
| 6,198,260 B1 * | 3/2001 | Wittenbreder | H02M 3/158 363/16 |
| 6,434,029 B1 | 8/2002 | Cyr et al. | |
| 2004/0264224 A1 | 12/2004 | Jang et al. | |
| 2013/0300390 A1 | 11/2013 | Lee et al. | |
| 2014/0140109 A1 | 5/2014 | Valley | |

(Continued)

FOREIGN PATENT DOCUMENTS

| | | |
|---|---|---|
| CN | 103391008 B | 4/2017 |
| CN | 103840673 B | 11/2018 |
| CN | 213243821 U | 5/2021 |

(Continued)

*Primary Examiner* — Monica Lewis
*Assistant Examiner* — Ularislao Cordova
(74) *Attorney, Agent, or Firm* — Li & Cai Intellectual Property (USA) Office

(57) ABSTRACT

A boost converter is provided. A first terminal of a first inductor of the boost converter is connected to a positive terminal of an input power source. In the of the boost converter, a second terminal of the first inductor is connected to a first terminal of a resonant inductor, and a second terminal of the resonant inductor is connected to a first terminal of a main switch. A second terminal of the main switch is connected to a negative terminal of the input power source. In the of the boost converter, a first terminal of a clamp switch is connected to the second terminal of the resonant inductor, a second terminal of the clamp switch is connected to a first terminal of a first storage capacitor, and a second terminal of the first storage capacitor is connected to the first terminal of the first inductor.

8 Claims, 10 Drawing Sheets

(56) References Cited

U.S. PATENT DOCUMENTS

2021/0194344 A1* 6/2021 Makhoul ............... H02M 7/537

FOREIGN PATENT DOCUMENTS

| TW | I387184 | B1 | | 2/2013 | | |
|----|---------|----|----|--------|----|----|
| TW | I507840 | B  | | 11/2015 | | |
| TW | I575860 |    | * | 3/2017 | ............ | H02M 3/335 |
| TW | I575860 | B  | | 3/2017 | | |
| TW | I581552 | B  | | 5/2017 | | |
| TW | I666863 | B  | | 7/2019 | | |

* cited by examiner

BOOST CONVERTER

CROSS-REFERENCE TO RELATED PATENT APPLICATION

This application claims the benefit of priority to Taiwan Patent Application No. 111146078, filed on Dec. 1, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a boost converter that is capable of supplying a high output voltage.

BACKGROUND OF THE DISCLOSURE

Power converters are indispensable for electronic devices. The power converters are used to adjust power and supply the adjusted power to the electronic devices. The power converters include buck converters and boost converters. In conventional circuit architectures of the boost converters, switch components are controlled according to control signals having large working periods, such that they are turned on for longer lengths of time. As a result, output voltages of the boost converters are increased, but more ripple waves are generated in input signals of the boost converters and excessive power is consumed by circuit components of the boost converters in various applications.

SUMMARY OF THE DISCLOSURE

In response to the above-referenced technical inadequacies, the present disclosure provides a boost converter. The boost converter includes a booster circuit and a boosted output increasing circuit. The booster circuit includes a first inductor, a resonant inductor, a main switch, a clamp switch, a first storage capacitor, an output booster and an output capacitor. A first terminal of the first inductor is connected to a positive terminal of an input power source. A first terminal of the resonant inductor is connected to a second terminal of the first inductor. A first terminal of the main switch is connected to a second terminal of the resonant inductor. A second terminal of the main switch is connected to a negative terminal of the input power source. A control terminal of the main switch receives a first control signal from an external circuit connected to the control terminal of the main switch. A first terminal of the clamp switch is connected to the second terminal of the resonant inductor. A control terminal of the clamp switch receives a second control signal from the external circuit connected to the control terminal of the clamp switch. A first terminal of the first storage capacitor is connected to a second terminal of the clamp switch. A second terminal of the first storage capacitor is connected to the first terminal of the first inductor. An output booster circuit includes a plurality of output inductors. The plurality of output inductors are connected to each other in series. A first terminal of one of the plurality of output inductors is connected to the second terminal of the first inductor. A first terminal of the output capacitor is connected to a second terminal of another one of the plurality of output inductors. A second terminal of the output capacitor is connected to the negative terminal of the input power source. The boosted output increasing circuit includes a second inductor and a second storage capacitor. A first terminal of the second inductor is connected to the second terminal of the first inductor. A first terminal of the second storage capacitor is connected to a second terminal of the second inductor. A second terminal of the second storage capacitor is connected to the second terminal of the main switch.

In certain embodiments, the first inductor is a coupled inductor.

In certain embodiments, the second inductor is a coupled inductor.

In certain embodiments, the boosted output increasing circuit includes a plurality of boosted output increasing sub-circuits. The boosted output increasing sub-circuits are connected in parallel to each other. Each of the plurality of boosted output increasing sub-circuits includes the second inductor and the second storage capacitor.

In certain embodiments, the output inductors of the output booster circuit include a first output inductor and a second output inductor. A first terminal of the first output inductor is connected to the second terminal of the first inductor. A first terminal of the second output inductor is connected to a second terminal of the first output inductor. A second terminal of the second output inductor is connected to the first terminal of the output capacitor.

In certain embodiments, the output booster circuit further includes a diode. An anode of the diode is connected to the second terminal of the second output inductor. A cathode of the diode is connected to the first terminal of the output capacitor.

In certain embodiments, the output booster circuit further includes a third output inductor. A first terminal of the third output inductor is connected to the second terminal of the second output inductor. A second terminal of the third output inductor is connected to the first terminal of the output capacitor.

In certain embodiments, the output booster circuit further includes a diode. An anode of the diode is connected to the second terminal of the third output inductor. A cathode of the diode is connected to the first terminal of the output capacitor.

In certain embodiments, the output inductors of the output booster circuit include a first output inductor and a second output inductor. The output booster circuit further includes a diode, a first capacitor, an auxiliary diode and a second capacitor. A first terminal of the first output inductor is connected to the second terminal of the first inductor. A second terminal of the first output inductor is connected to an anode of the diode. A cathode of the diode is connected to a first terminal of the first capacitor. A second terminal of the first capacitor is connected to the negative terminal of the input power source. A first terminal of the second output inductor is connected to the first terminal of the first capacitor. An anode of the auxiliary diode is connected to a second terminal of the second output inductor. A cathode of the auxiliary diode is connected to a first terminal of the second capacitor. A second terminal of the second capacitor is connected to the first terminal of the first capacitor.

As described above, the present disclosure provides the boost converter. By including more circuit components compared to a conventional boost converter, the boost converter of the disclosure is still capable of supplying a high output voltage to the output resistor even when being affected the resonance phenomenon, and only consumes low power without causing ripple waves having excessive voltages.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
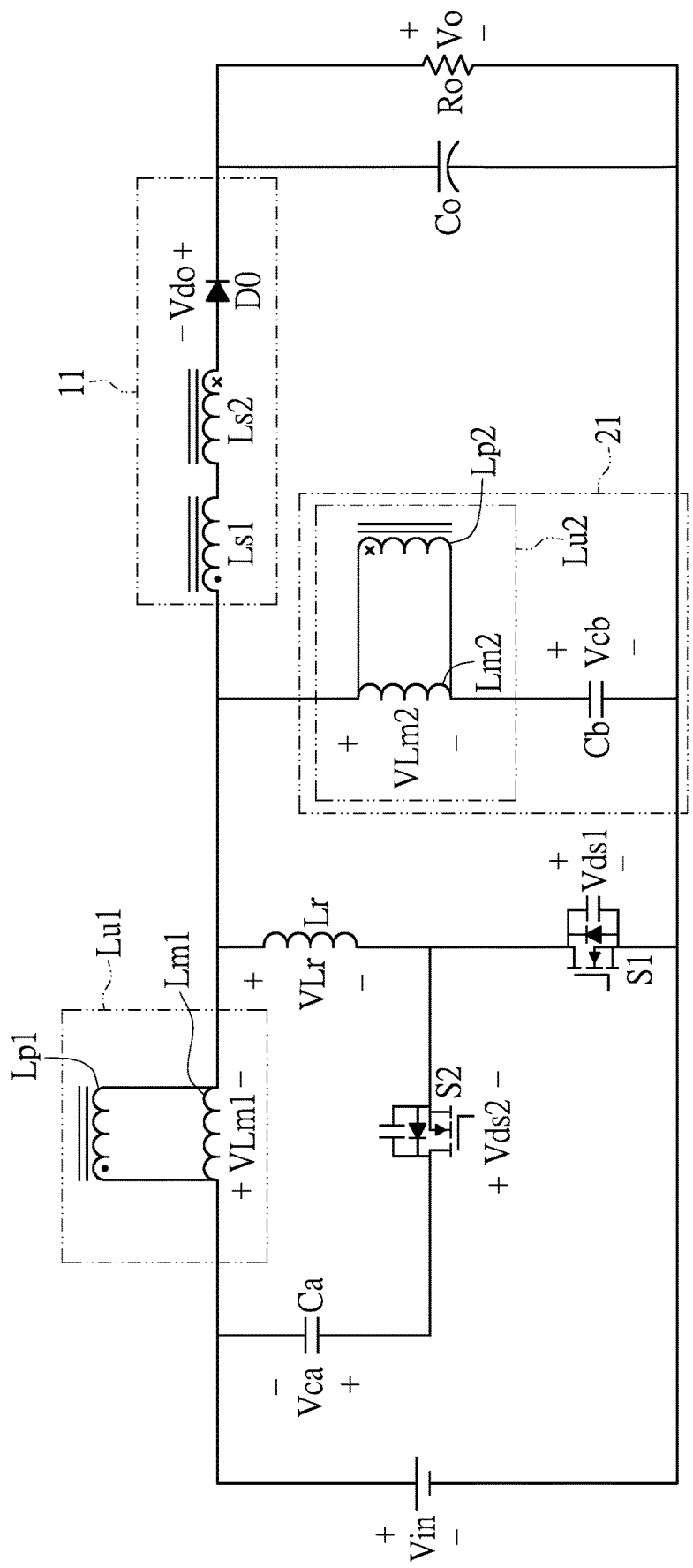
FIG. 1 is a circuit diagram of a boost converter according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIGS. 1 to 7, in which FIG. 1 is a circuit diagram of a boost converter according to a first embodiment of the present disclosure, and FIGS. 2 to 7 are schematic diagrams of operation of a plurality of circuit components of the boost converter according to the first embodiment of the present disclosure.

The boost converter of the first embodiment of the present disclosure includes a booster circuit. As shown in FIG. 1, the booster circuit may include a first inductor Lu1, a resonant inductor Lr, a main switch S1, a clamp switch S2, a first storage capacitor Ca, an output booster circuit 11 and an output capacitor Co. For example, the first inductor Lu1 may be a coupled inductor including a magnetizing inductor Lm1 and a primary-side inductor Lp1 that are coupled to each other via electromagnetic induction, but the present disclosure is not limited thereto.

It is worth noting that, the boost converter of the present disclosure further includes a boosted output increasing circuit 21. The boosted output increasing circuit 21 is configured to assist operation of the booster circuit to increase an output voltage Vo of the boost converter of the present disclosure. As shown in FIG. 1, the boosted output increasing circuit 21 of the first embodiment of the present disclosure includes a second inductor Lu2 and a second storage capacitor Cb. For example, the second inductor Lu2 may be a coupled inductor including a magnetizing inductor Lm2 and a primary-side inductor Lp2 that are coupled to each other via electromagnetic induction, but the present disclosure is not limited to.

A first terminal of (the magnetizing inductor Lm1 of) the first inductor Lu1 is connected to a positive terminal of an input power source Vin. A second terminal of (the magnetizing inductor Lm1 of) the first inductor Lu1 is connected to a first terminal of the resonant inductor Lr. A second terminal of the resonant inductor Lr is connected to a first terminal of the main switch S1. A second terminal of the main switch S1 is connected to a negative terminal of the input power source Vin. A control terminal of the main switch S1 may be connected to an external circuit and may receive a first control signal from the external circuit. The main switch S1 may operate according to the first control signal from the external circuit.

A first terminal of the clamp switch S2 is connected to the second terminal of the resonant inductor Lr. A control terminal of the clamp switch S2 may be connected to an external circuit and may receive a second control signal from the external circuit. The clamp switch S2 may operate according to the second control signal from the external circuit. A second terminal of the clamp switch S2 is connected to a first terminal of the first storage capacitor Ca. A second terminal of the first storage capacitor Ca is connected to the first terminal of (the magnetizing inductor Lm1 of) the first inductor Lu1.

It is worth noting that, in the boosted output increasing circuit 21 of the first embodiment of the present disclosure, the second inductor Lu2 and the second storage capacitor Cb are connected to each other in series. A first terminal of (the magnetizing inductor Lm2 of) the second inductor Lu2 of the boosted output increasing circuit 21 is connected to the second terminal of (the magnetizing inductor Lm1 of) the first inductor Lu1. A second terminal of (the magnetizing inductor Lm2 of) the second inductor Lu2 is connected to a first terminal of the second storage capacitor Cb. A second terminal of the second storage capacitor Cb is connected to the second terminal of the main switch S1.

In the first embodiment of the present disclosure, the output booster circuit 11 includes a first output inductor Ls1, a second output inductor Ls2 and a diode D0, but the present disclosure is not limited thereto.

A first terminal of the first output inductor Ls1 is connected to the second terminal of (the magnetizing inductor Lm1 of) the first inductor Lu1. A second terminal of the first output inductor Ls1 is connected to a first terminal of the second output inductor Ls2. A second terminal of the second output inductor Ls2 is connected to an anode of the diode D0.

A cathode of the diode D0 is connected to a first terminal of the output capacitor Co. A second terminal of the output capacitor Co is connected to the negative terminal of the input power source Vin. The output capacitor Co may be connected to an output resister Ro in parallel. A voltage of the output resister Ro may be used as the output voltage Vo of the boost converter.

The circuit components of the boost converter of the first embodiment of the present disclosure sequentially perform operations in an order as shown in FIGS. 2 to 7, and may repeatedly perform the operations. The circuit components through which any current does not flow is marked by a light-colored line as shown in FIGS. 2 to 7. An order of performing the operations shown in FIGS. 2 to 7 by the circuit components of the boost converter of the present disclosure is described in the following, but the present disclosure is not limited thereto. In practice, the order of performing the operations by the boost converter of the present disclosure may be adjusted according to actual requirements.

Figure 2:
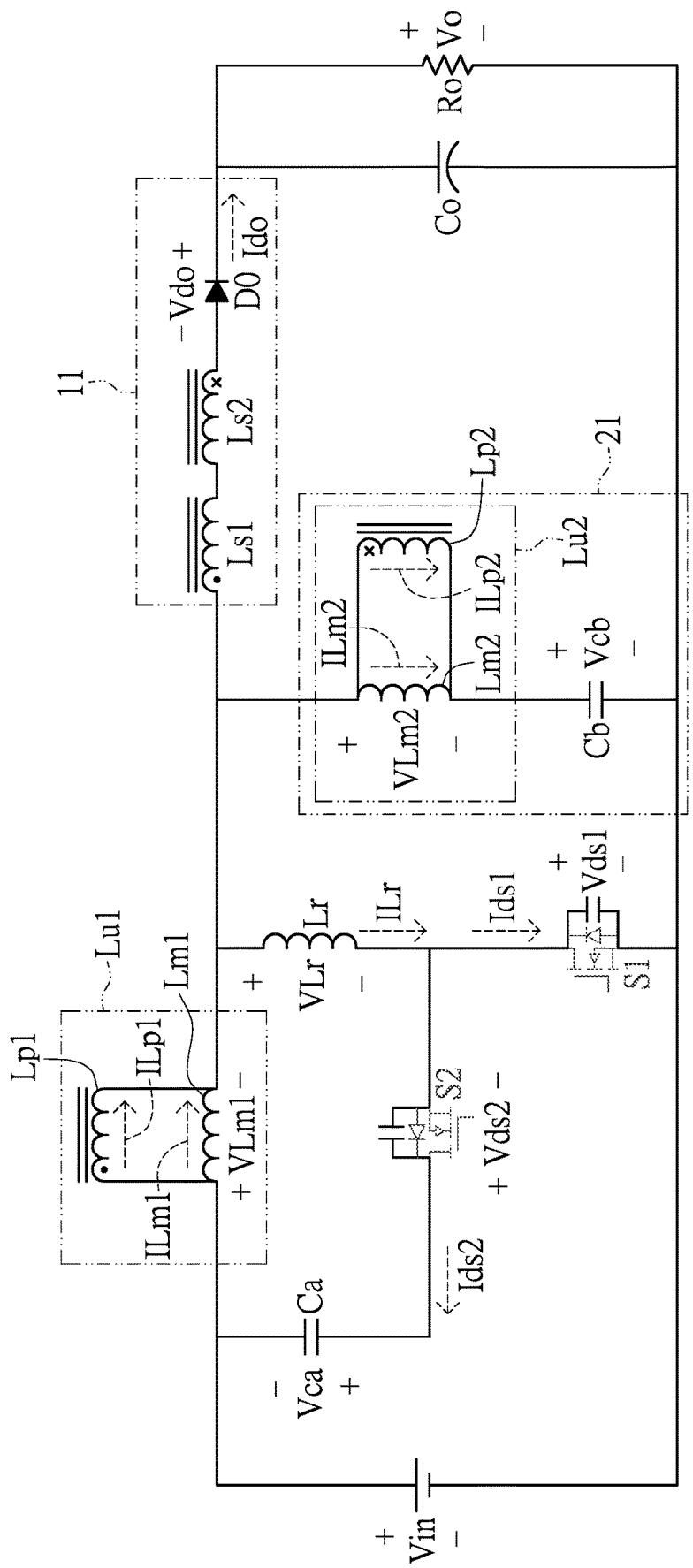
FIG. 2 is a schematic diagram of a plurality of circuit components of the boost converter in operation according to the first embodiment of the present disclosure.

First, as shown in FIG. 2, the clamp switch S2 and the main switch S1 are in an off state. At this time, a current ILr of the resonant inductor Lr is divided into a current Ids1 and a current Ids2. The current Ids2 flows to a parasitic capacitor of the clamp switch S2 to charge the parasitic capacitor of the clamp switch S2. The current Ids1 flows to the main switch S1 to discharge a voltage Vcb of the main switch S1 to a zero value.

Figure 3:
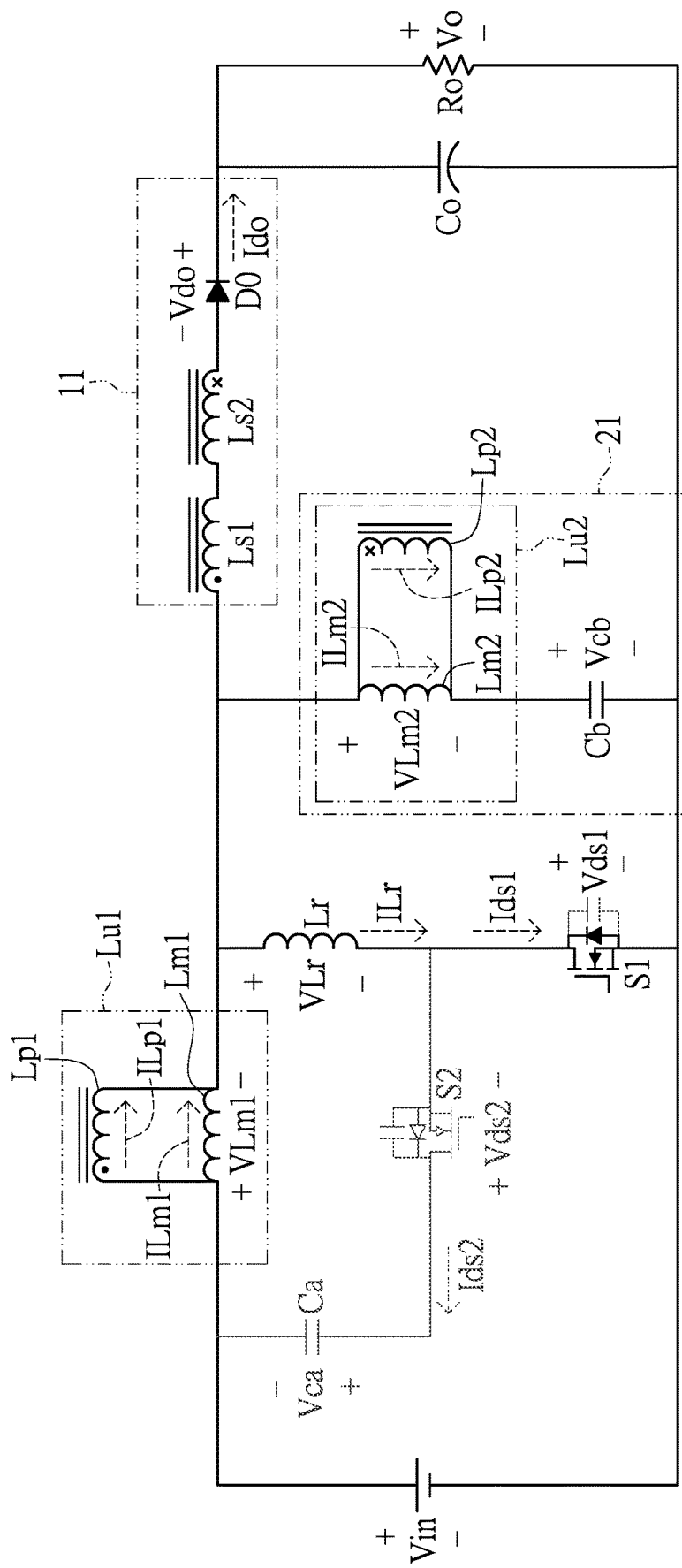
FIG. 3 is a schematic diagram of the plurality of circuit components of the boost converter according to the first embodiment of the present disclosure.
Figure 4:
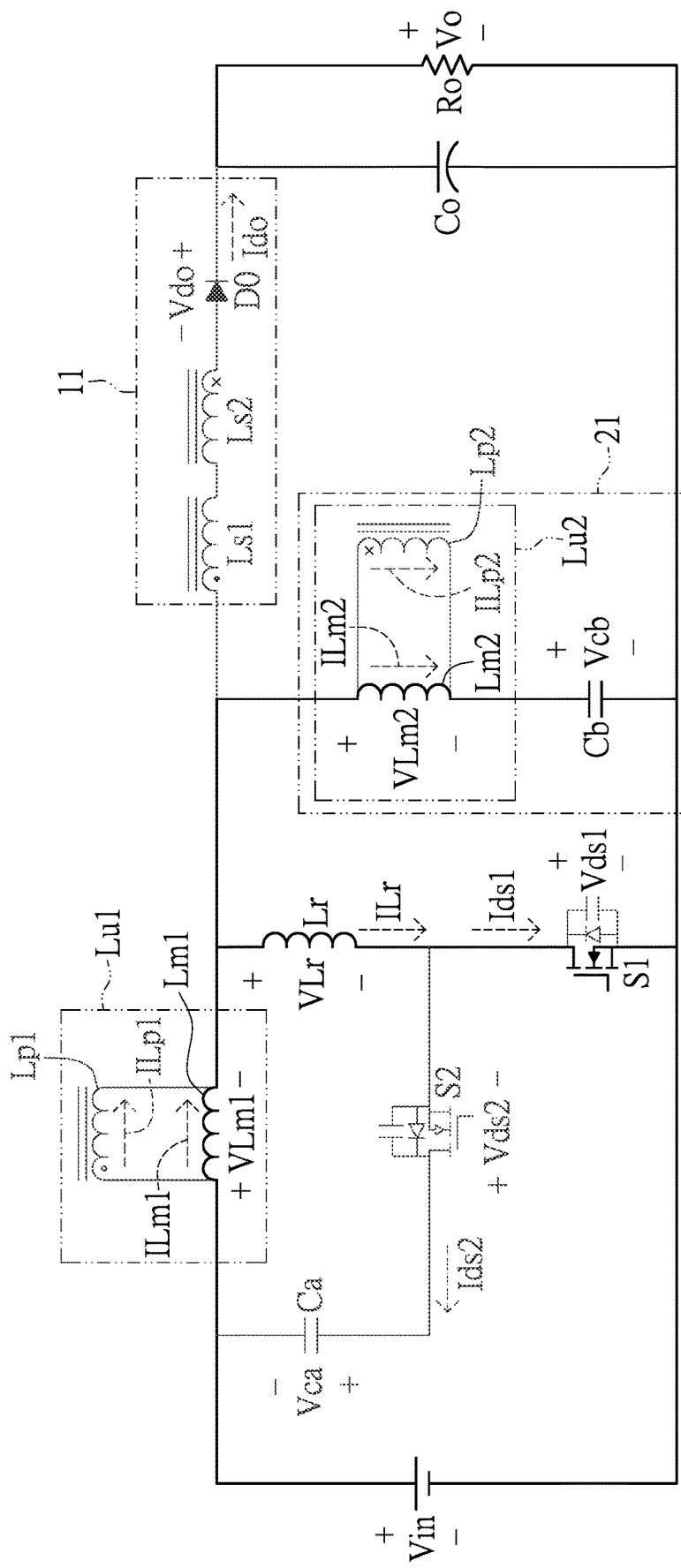
FIG. 4 is a schematic diagram of the plurality of circuit components of the boost converter according to the first embodiment of the present disclosure.

Then, as shown in FIGS. 3 and 4, the clamp switch S2 is still in the off state, but the main switch S1 is switched from the off state to an on state. At this time, a current of the input power source Vin flows sequentially through the first inductor Lu1, the resonant inductor Lr, the main switch S1 and the second storage capacitor Cb to the second inductor Lu2 for storing energy. A voltage of the second storage capacitor Cb storing the energy is equal to a voltage of the input power source Vin. The second storage capacitor Cb and the input power supply Vin function as two input voltage sources to supply the energy to the first inductor Lu1 and the second inductor Lu2. At this time, the energy is stored in the first inductor Lu1 and the second inductor Lu2. Then, a voltage VLm1 of the first inductor Lu1 and a voltage VLm2 of the second inductor Lu2 discharge to the first output inductor Ls1 and the second output inductor Ls2 of the output booster circuit 11. As a result, the output voltage Vo of the boost converter (that is a voltage of the output capacitor Co) is increased.

Figure 5:
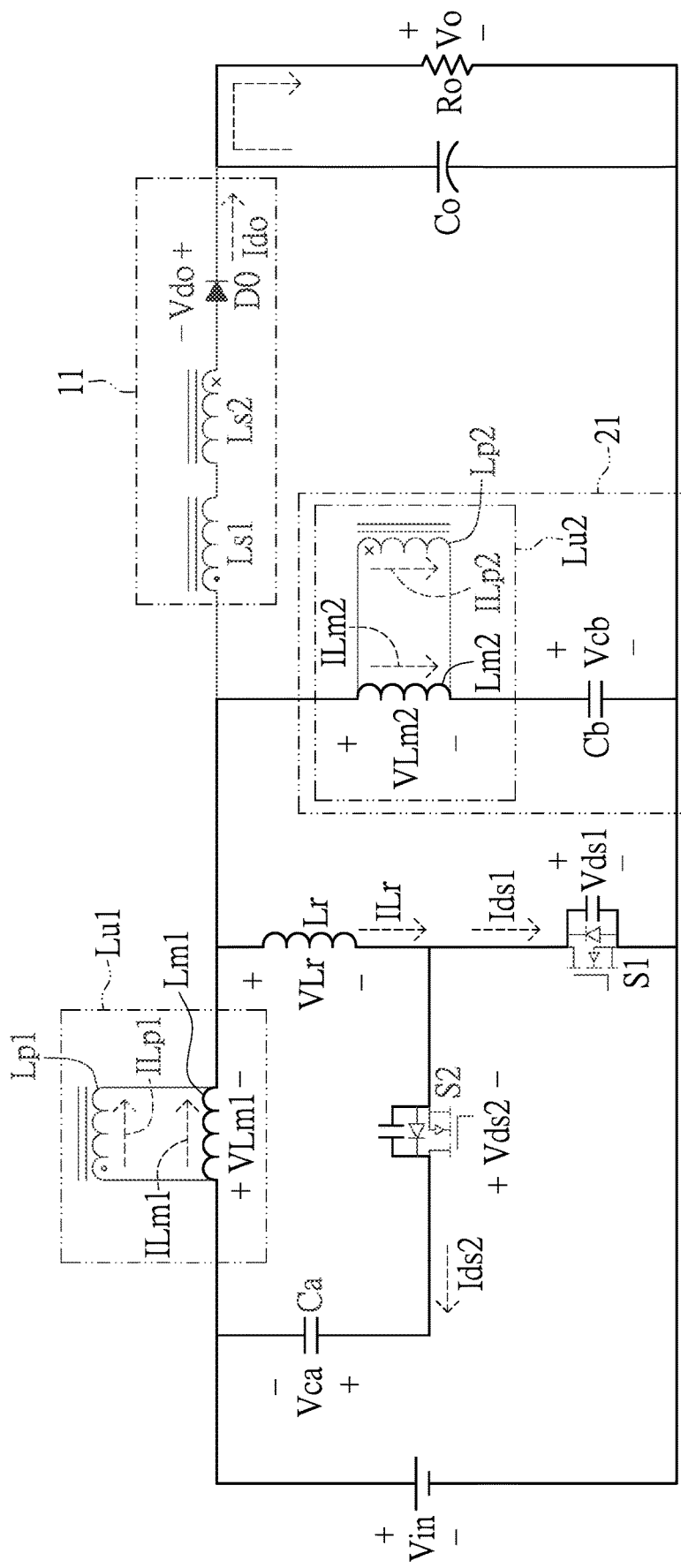
FIG. 5 is a schematic diagram of the plurality of circuit components of the boost converter according to the first embodiment of the present disclosure.
Figure 6:
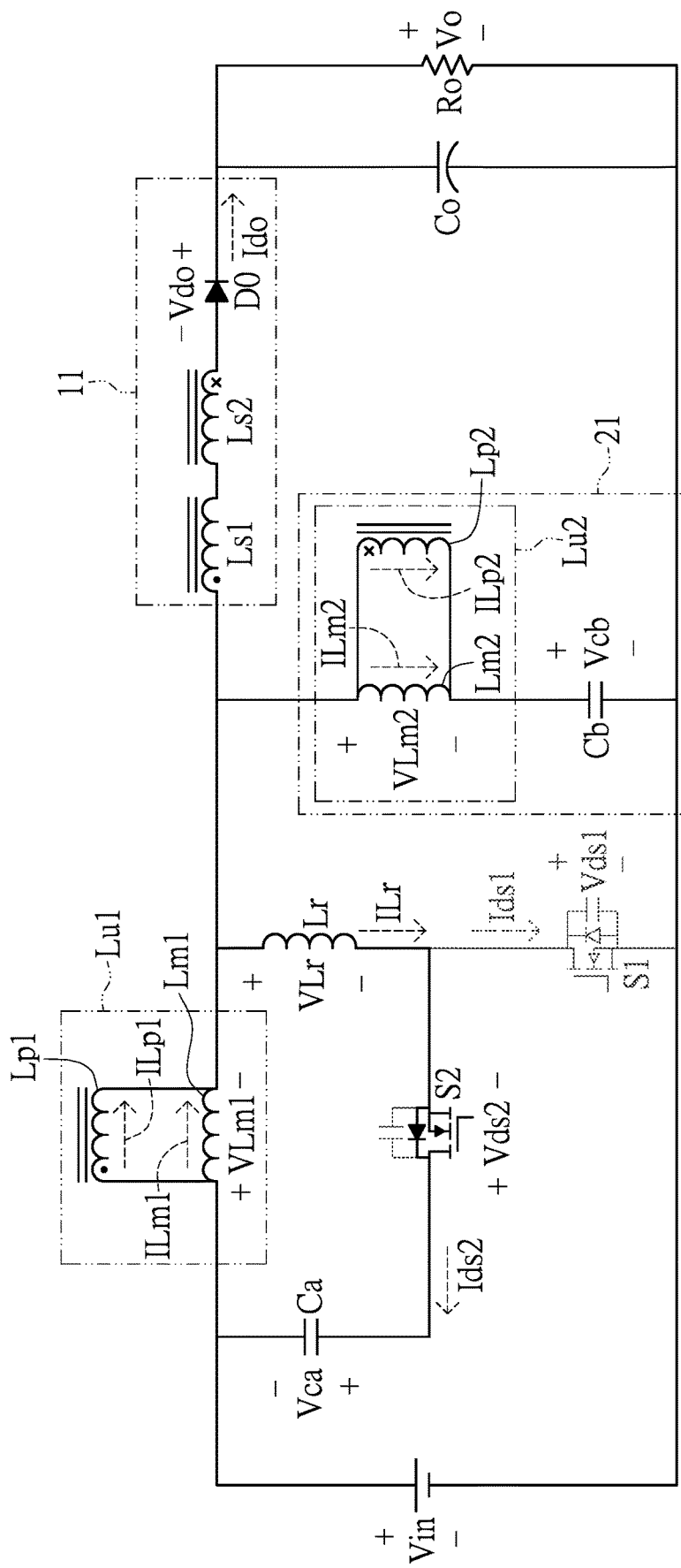
FIG. 6 is a schematic diagram of the plurality of circuit components of the boost converter according to the first embodiment of the present disclosure.
Figure 7:
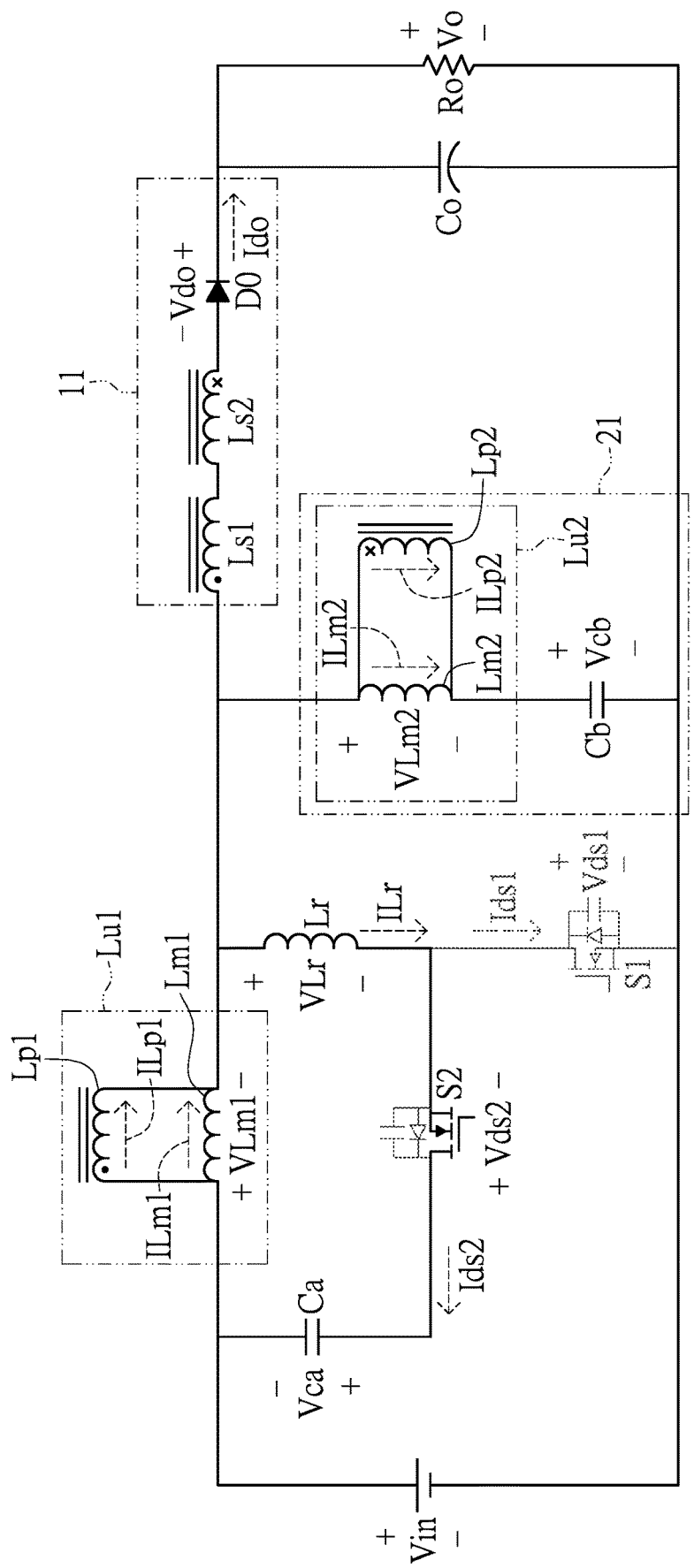
FIG. 7 is a schematic diagram of the plurality of circuit components of the boost converter according to the first embodiment of the present disclosure.

Then, as shown in FIG. 5, the main switch S1 is switched from the on state to the off state, and the clamp switch S2 is still in the off state. At this time, the current ILr of the resonant inductor Lr is divided into the current Ids1 and the current Ids2. The current Ids1 flows to the main switch S1 to charge the main switch S1. The current Ids2 flows to the parasitic capacitor of the clamp switch S2 to discharge a voltage of the parasitic capacitor of the clamp switch S2 to a zero value. At the same time, the output capacitor Co discharges to the output resistor Ro. As a result, as shown in FIG. 6, the clamp switch S2 is turned on by a zero voltage. Therefore, only a low amount of energy is consumed by the boost converter of the present disclosure. Finally, as shown in FIG. 7, the first inductor Lu1 and the second inductor Lu2 discharge to the output resistor Ro through the output booster circuit 11.

Therefore, the boost converter of the present disclosure that includes a boosted output increasing circuit such as the boosted output increasing circuit 21 (including the second inductor Lu2 and the second storage capacitor Cb) as shown in FIGS. 1 to 7 is capable of supplying the high output voltage Vo.

Figure 8:
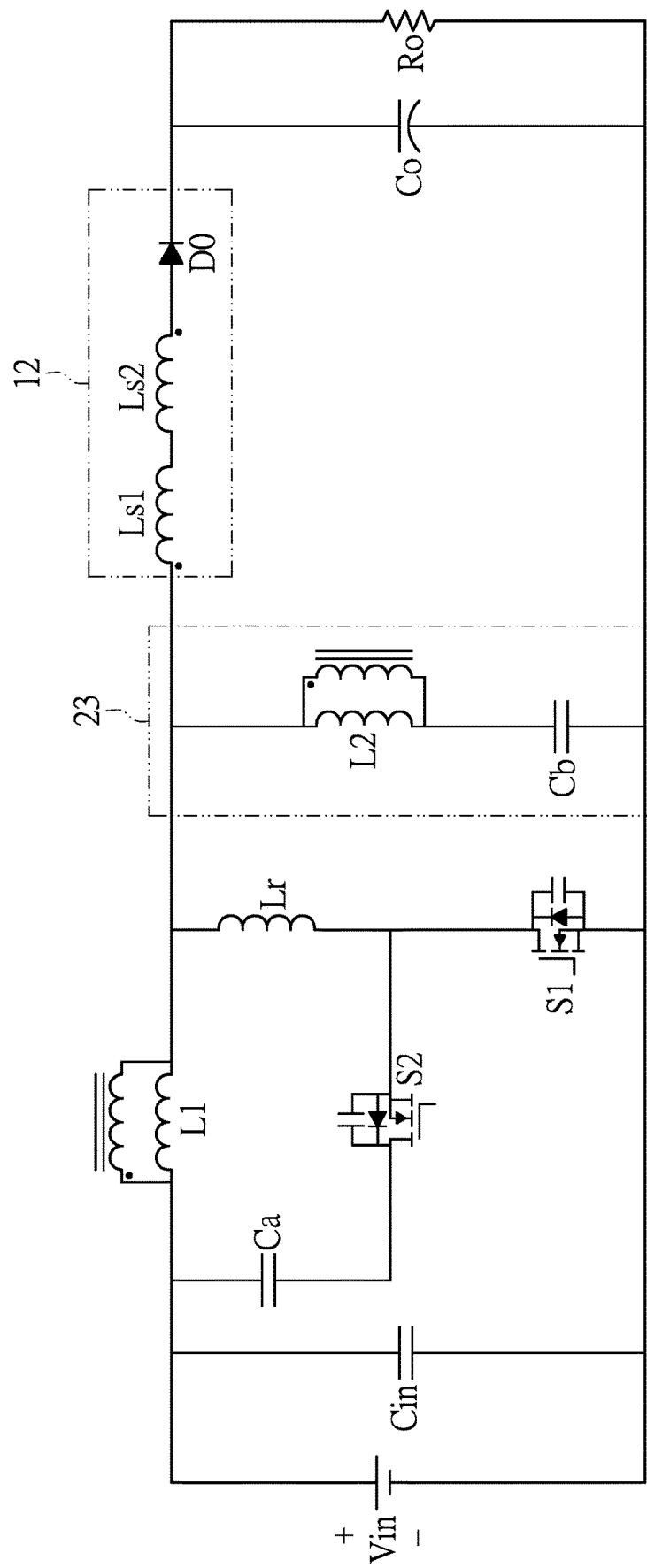
FIG. 8 is a circuit diagram of a boost converter according to a second embodiment of the present disclosure.

Reference is made to FIG. 8, which is a circuit diagram of a boost converter according to a second embodiment of the present disclosure. The same descriptions of the first and second embodiments of the present disclosure are not repeated herein.

A difference between the first and second embodiments is that, the boost converter of the second embodiment of the present disclosure further includes an input capacitor Cin. The capacitor Cin is connected to the input power source Vin in parallel. For example, the input power source Vin may charge the input capacitor Cin. After the input capacitor Cin is charged, the input capacitor Cin may be discharged to supply a discharge current to the boost converter such that the boost converter obtains an input voltage for operation.

That is, as shown in FIG. 8, the boost converter of the present disclosure includes a boosted output increasing circuit such as a boosted output increasing circuit 23 (including the second inductor Lu2 and the second storage capacitor Cb). Therefore, the first output inductor Ls1 and the second output inductor Ls2 of an output booster circuit 12 store more energy. As a result, the boost converter of the present disclosure is capable of supplying the high output voltage Vo.

Figure 9:
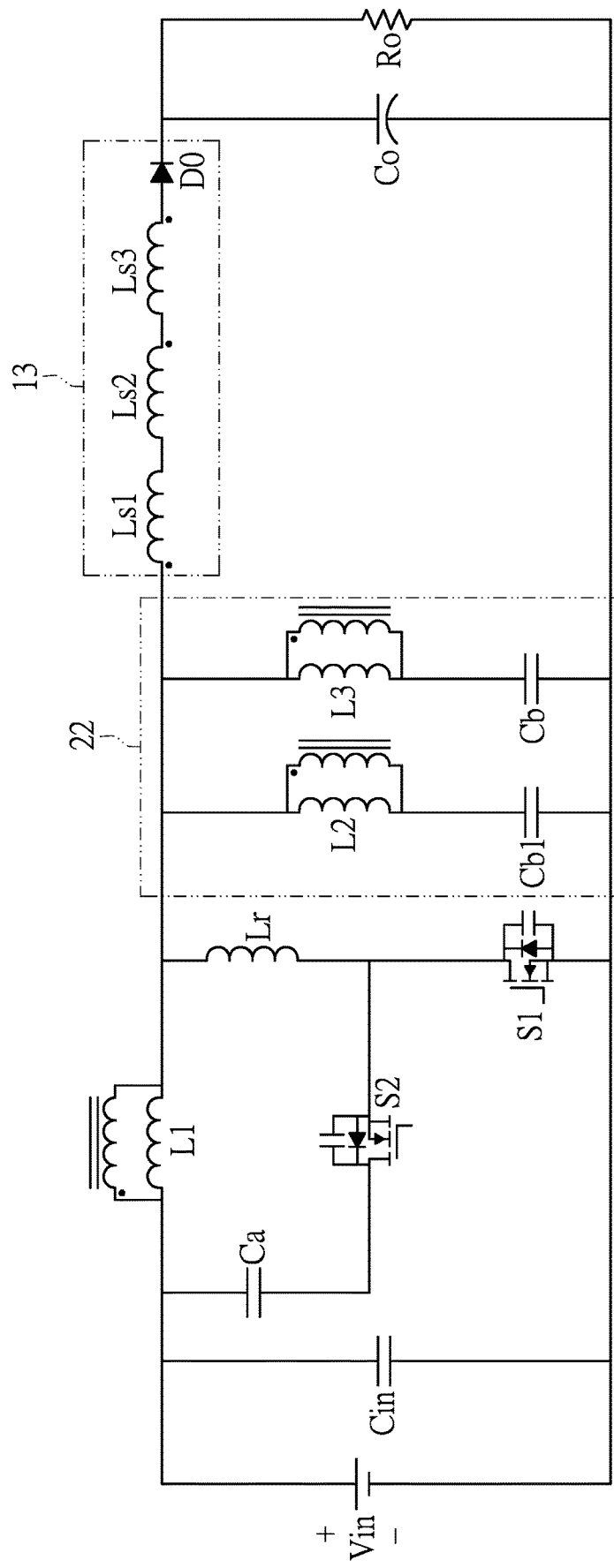
FIG. 9 is a circuit diagram of a boost converter according to a third embodiment of the present disclosure.

Reference is made to FIG. 9, which is a circuit diagram of a boost converter according to a third embodiment of the present disclosure. The same descriptions of the third and first embodiments of the present disclosure are not repeated herein.

The third embodiment of the boost converter of the present disclosure may include a first inductor L1, the resonant inductor Lr, the main switch S1, the clamp switch S2 and an output booster circuit 13.

It is worth noting that, the boosted output increasing circuit of the boost converter of the third embodiment of the present disclosure may include one or more boosted output increasing sub-circuits. If the boosted output increasing circuit includes the plurality of boosted output increasing sub-circuits, the plurality of boosted output increasing sub-circuits are connected in parallel to each other. Each of the plurality of boosted output increasing sub-circuits includes a second inductor and a storage capacitor. The second inductor and the storage capacitor are connected in series to each other. The more the boosted output increasing sub-circuits that are included in the boost converter of the present disclosure, the higher the output voltage that can be supplied by the boost converter of the present disclosure. The number of the boosted output increasing sub-circuits included in the boost converter of the present disclosure may be adjusted according to actual requirements.

For example, as shown in FIG. 1, the boosted output increasing circuit 21 of the first embodiment of the present disclosure includes only one output increasing sub-circuit including the second inductor Lu2 and the second storage capacitor Cb.

In contrast, as shown in FIG. 9, a boosted output increasing circuit 22 of the third embodiment of the present disclosure includes the plurality of boosted output increasing sub-circuits such as a first boosted output increasing sub-circuit and a second boosted output increasing sub-circuit. The first boosted output increasing sub-circuit includes a second inductor L2 and a second storage capacitor Cb1. The second boosted output increasing sub-circuit includes a second inductor L3 and the second storage capacitor Cb.

A first terminal of the second inductor L2 is connected to a second terminal of the first inductor L1. A second terminal of the second inductor L2 is connected to a first terminal of the second storage capacitor Cb1. A second terminal of the second storage capacitor Cb1 is connected to the second terminal of the main switch S1.

A first terminal of the second inductor L3 is connected to the second terminal of the first inductor L1. A second terminal of the second inductor L3 is connected to the first terminal of the second storage capacitor Cb. The second terminal of the second storage capacitor Cb is connected to the second terminal of the main switch S1.

In addition, a difference between the third, first and second embodiments is that, the output booster circuit 13 of the boost converter of the third embodiment of the present disclosure not only includes the first output inductor Ls1 and the second output inductor Ls2, but also includes a third output inductor Ls3. If necessary, the boost converter of the present disclosure may include more inductors.

A first terminal of the third output inductor Ls3 is connected to the second terminal of the second output inductor Ls2. A second terminal of the third output inductor Ls3 is connected to the anode of the diode D0. The cathode of the diode D0 is connected to the first terminal of the output capacitor Co.

Figure 10:
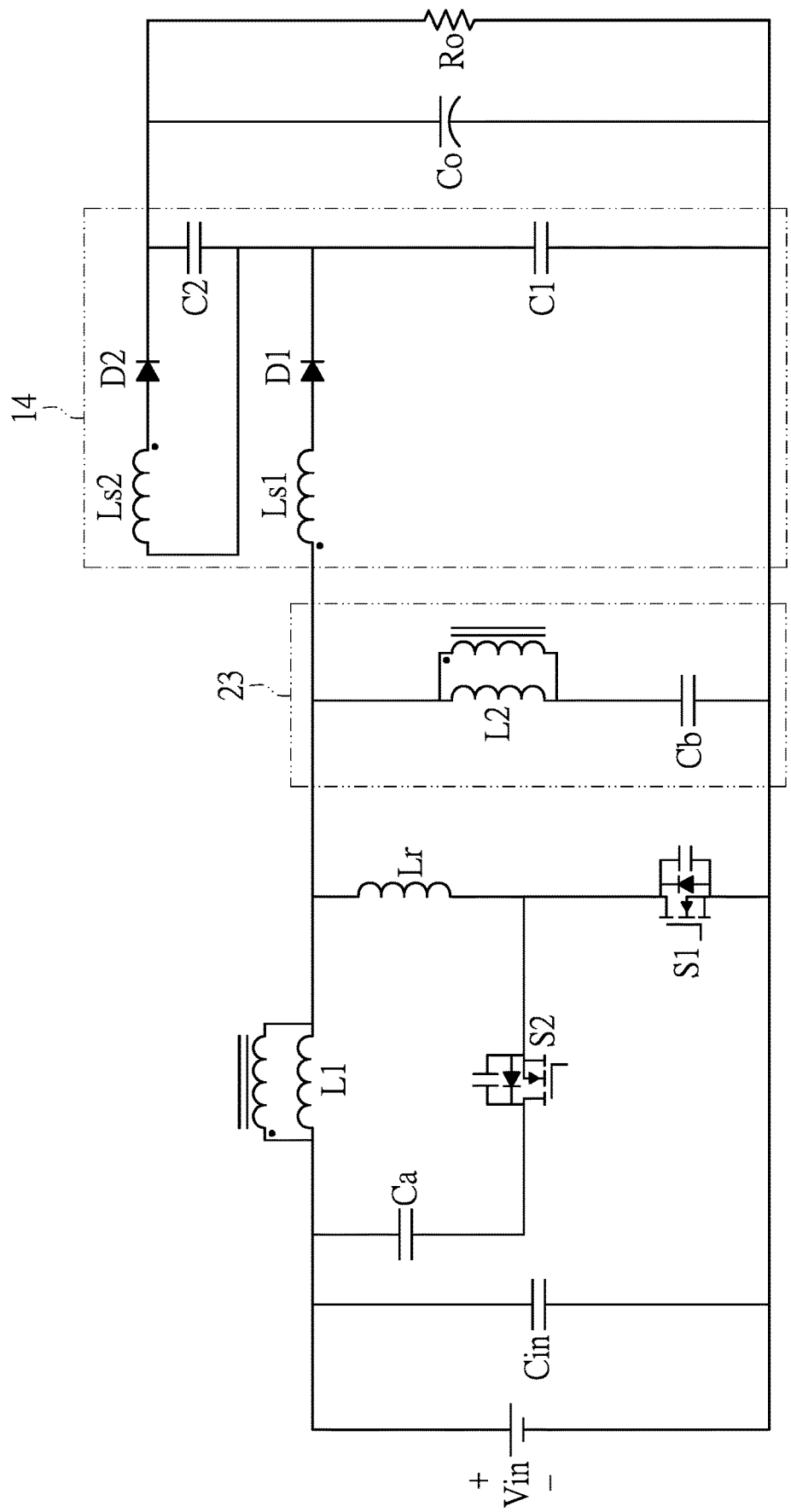
FIG. 10 is a circuit diagram of a boost converter according to a fourth embodiment of the present disclosure.

Reference is made to FIG. 10, which is a circuit diagram of a boost converter according to a fourth embodiment of the present disclosure. The same descriptions of the fourth, first and second embodiments of the present disclosure are not repeated herein.

An output booster circuit 14 of the boost converter of the fourth embodiment of the present disclosure includes the first output inductor Ls1, a diode D1, a first capacitor C1, the second output inductor Ls2, an auxiliary diode D2 and a second capacitor C2.

The first terminal of the first output inductor Ls1 is connected to the second terminal of the first inductor L1. The second terminal of the first output inductor Ls1 is connected to an anode of the diode D1. A cathode of the diode D1 is connected to a first terminal of the first capacitor C1. A second terminal of the first capacitor C1 is connected to the negative terminal of the input power source Vin.

The first terminal of the second output inductor Ls2 is connected to the cathode of the diode D1 and the first terminal of the first capacitor C1. The second terminal of the second output inductor Ls2 is connected to an anode of the diode D2. A cathode of the diode D2 is connected to a first terminal of the second capacitor C2. A second terminal of the second capacitor C2 is connected to the first terminal of the first capacitor C1 and the first terminal of the second output inductor Ls2.

In conclusion, the present disclosure provides the boost converter. By including more circuit components compared to a conventional boost converter, the boost converter of the disclosure is still capable of supplying a high output voltage to the output resistor even when being affected the resonance phenomenon, and only consumes low power without causing ripple waves having excessive voltages.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A boost converter, comprising:
   a booster circuit, including:
      a first inductor, wherein a first terminal of the first inductor is connected to a positive terminal of an input power source;
      a resonant inductor, wherein a first terminal of the resonant inductor is connected to a second terminal of the first inductor;
      a main switch, wherein a first terminal of the main switch is connected to a second terminal of the resonant inductor, a second terminal of the main switch is connected to a negative terminal of the input power source, and a control terminal of the main switch receives a first control signal from an external circuit connected to the control terminal of the main switch;
      a clamp switch, wherein a first terminal of the clamp switch is connected to the second terminal of the resonant inductor, and a control terminal of the clamp switch receives a second control signal from the external circuit connected to the control terminal of the clamp switch;
      a first storage capacitor, wherein a first terminal of the first storage capacitor is connected to a second terminal of the clamp switch, and a second terminal of the first storage capacitor is connected to the first terminal of the first inductor;
   an output booster circuit including a plurality of output inductors connected to each other in series, wherein a first terminal of one of the plurality of output inductors is connected to the second terminal of the first inductor; and
   an output capacitor, wherein a first terminal of the output capacitor is connected to a second terminal of another one of the plurality of output inductors, and a second terminal of the output capacitor is connected to the negative terminal of the input power source; and a boosted output increasing circuit, including:
  a second inductor, wherein a first terminal of the second inductor is connected to the second terminal of the first inductor; and
  a second storage capacitor, wherein a first terminal of the second storage capacitor is connected to a second terminal of the second inductor, and a second terminal of the second storage capacitor is connected to the second terminal of the main switch;
  wherein the boosted output increasing circuit includes a plurality of boosted output increasing sub-circuits, the plurality of boosted output increasing sub-circuits are connected in parallel to each other, and each of the plurality of boosted output increasing sub-circuits includes the second inductor and the second storage capacitor.

2. The boost converter according to claim 1, wherein the first inductor is a coupled inductor.

3. The boost converter according to claim 1, wherein the second inductor is a coupled inductor.

4. The boost converter according to claim 1, wherein the plurality of output inductors of the output booster circuit include:
  a first output inductor, wherein a first terminal of the first output inductor is connected to the second terminal of the first inductor; and
  a second output inductor, wherein a first terminal of the second output inductor is connected to a second terminal of the first output inductor, and a second terminal of the second output inductor is connected to the first terminal of the output capacitor.

5. The boost converter according to claim 4, wherein the output booster circuit further includes:
  a diode, wherein an anode of the diode is connected to the second terminal of the second output inductor, and a cathode of the diode is connected to the first terminal of the output capacitor.

6. The boost converter according to claim 4, wherein the output booster circuit further includes:
  a third output inductor, wherein a first terminal of the third output inductor is connected to the second terminal of the second output inductor, and a second terminal of the third output inductor is connected to the first terminal of the output capacitor.

7. The boost converter according to claim 6, wherein the output booster circuit further includes:
  a diode, wherein an anode of the diode is connected to the second terminal of the third output inductor, and a cathode of the diode is connected to the first terminal of the output capacitor.

8. The boost converter according to claim 1, wherein the plurality of output inductors of the output booster circuit include a first output inductor and a second output inductor, and the output booster circuit further includes a diode, a first capacitor, an auxiliary diode and a second capacitor;
  wherein a first terminal of the first output inductor is connected to the second terminal of the first inductor, a second terminal of the first output inductor is connected to an anode of the diode, a cathode of the diode is connected to a first terminal of the first capacitor, a second terminal of the first capacitor is connected to the negative terminal of the input power source, a first terminal of the second output inductor is connected to the first terminal of the first capacitor, an anode of the auxiliary diode is connected to a second terminal of the second output inductor, a cathode of the auxiliary diode is connected to a first terminal of the second capacitor, and a second terminal of the second capacitor is connected to the first terminal of the first capacitor.

* * * * *